(12) United States Patent
Arno (10) Patent No.: US 11,509,223 B2
(45) Date of Patent: Nov. 22, 2022

(54) SWITCHED-MODE POWER SUPPLY WITH BYPASS MODE

(71) Applicant: STMicroelectronics (Alps) SAS, Grenoble (FR)

(72) Inventor: Patrik Arno, Sassenage (FR)

(73) Assignee: STMicroelectronics (Alps) SAS, Grenoble (FR)

(*) Notice: Subject to any disclaimer, the term of this patent is extended or adjusted under 35 U.S.C. 154(b) by 0 days.

(21) Appl. No.: 17/200,498

(22) Filed: Mar. 12, 2021

(65) Prior Publication Data

US 2021/0203226 A1    Jul. 1, 2021

Related U.S. Application Data (62) Division of application No. 16/385,214, filed on Apr. 16, 2019, now Pat. No. 10,965,212.

(30) Foreign Application Priority Data

Apr. 17, 2018  (FR) ........................................ 1853364
Apr. 17, 2018  (FR) ........................................ 1853366

(51) Int. Cl.
  *H02M 3/158*  (2006.01)
  *H02M 3/156*  (2006.01)
  *H02M 1/00*   (2006.01)

(52) U.S. Cl.
  CPC ......... *H02M 3/158* (2013.01); *H02M 1/0025* (2021.05); *H02M 1/0032* (2021.05); *H02M 3/156* (2013.01)

(58) Field of Classification Search
  CPC .... H02M 3/156; H02M 3/158; H02M 1/0025; H02M 1/0032
  See application file for complete search history.

(56) References Cited

U.S. PATENT DOCUMENTS

| | | |
|---|---|---|
| 4,185,251 A | 1/1980 | Brown, Jr. et al. |
| 5,627,460 A | 5/1997 | Bazinet et al. |
| 5,919,262 A | 7/1999 | Kikinis et al. |
| 2004/0032293 A1 | 2/2004 | Maigret et al. |
| 2006/0176098 A1 | 8/2006 | Chen et al. |
| 2007/0176636 A1 | 8/2007 | Liu et al. |

(Continued)

FOREIGN PATENT DOCUMENTS

| | | |
|---|---|---|
| CN | 103151926 A | 6/2013 |
| CN | 104049662 A | 9/2014 |

(Continued)

OTHER PUBLICATIONS

Linear Technology Corporation, "60v Low IQ Step-Down DC/DC Controller with 100% Duty Cycle Capability", LTC3864, www.linear.com/LTC3864, Revision Jun. 14, 2012, 30 pages.

(Continued)

*Primary Examiner* — Alex Torres-Rivera
(74) *Attorney, Agent, or Firm* — Slater Matsil, LLP (57) ABSTRACT

In an embodiment, an SMPS comprises a half-bridge, and a driver configured to drive the half-bridge based on a PWM signal. The SMPS further comprising a first circuit coupled between the output of the driver and a control terminal of a high-side transistor of the half-bridge, wherein the first circuit is configured to maintain the first transistor on when the PWM signal has a duty cycle that is substantially 100%.

22 Claims, 7 Drawing Sheets

(56) References Cited

U.S. PATENT DOCUMENTS

| | | |
|---|---|---|
| 2008/0067987 A1 | 3/2008 | Tung et al. |
| 2009/0102440 A1 | 4/2009 | Coles |
| 2009/0237055 A1* | 9/2009 | Sakai .............. H02M 3/1588 323/284 |
| 2010/0001703 A1 | 1/2010 | Williams |
| 2012/0319499 A1* | 12/2012 | Ooishi ............. H02M 3/156 307/104 |
| 2013/0021009 A1 | 1/2013 | Waltman et al. |
| 2013/0169248 A1 | 7/2013 | Zhang et al. |
| 2014/0009130 A1 | 1/2014 | Galbis et al. |
| 2014/0266118 A1 | 1/2014 | Chung et al. |
| 2014/0062449 A1 | 3/2014 | Qu et al. |
| 2014/0152284 A1 | 6/2014 | Rozek |
| 2015/0076906 A1* | 3/2015 | Tam ................ H02M 3/156 307/31 |
| 2015/0180335 A1 | 6/2015 | Takada et al. |
| 2015/0249382 A1 | 9/2015 | Pignolo |
| 2016/0336858 A1* | 11/2016 | Nomiyama .......... H02M 3/158 |
| 2017/0147019 A1 | 5/2017 | Kim |
| 2020/0161978 A1* | 5/2020 | Lin ................. H02M 3/337 |

FOREIGN PATENT DOCUMENTS

| | | |
|---|---|---|
| CN | 105305818 A | 2/2016 |
| CN | 210093111 U | 2/2020 |

OTHER PUBLICATIONS

National Semiconductor, "LM2706 Miniature, Variable, Step-Down DC-DC Converter with Bypass for RF Power Amplifiers", XP055530782, Feb. 28, 2004, 15 pages.

Texas Instruments, "LM3242 6MHz, 750mA Miniature, Adjustable, Step-Down DC-DC Converter with Auto Bypass for RF Power Amplifiers", SNOSB48D—Oct. 2011—Revised Mar. 2013, 27 pages.

Maxim Integrated, "24V Internal Switch, 100% Duty Cycle, Step-Down Converters", MAX1836/MAX1837, Rev. 3, Jul. 2006, 15 pages.

Zhao, Lingyun et al., "DC-DC Power Conversions and System Design Considerations for Battery Operated System", ResearchGate, Jan. 2006, 18 pages.

* cited by examiner

SWITCHED-MODE POWER SUPPLY WITH BYPASS MODE

CROSS-REFERENCE TO RELATED APPLICATIONS

This application is a divisional of U.S. patent application Ser. No. 16/385,214, filed Apr. 16, 2019, which application claims priority to French Patent Application No. 1853366, filed on Apr. 17, 2018, and to French Patent Application No. 1853364, filed on Apr. 17, 2018, both applications are hereby incorporated herein by reference.

TECHNICAL FIELD

The present disclosure concerns generally to an electronic system and method, and, in particular embodiments, to switched-mode power supplies.

BACKGROUND

Switched-mode power supplies are DC/DC converters which incorporate one or more switching elements. Like other types of power supplies, switched-mode power supplied transfer a power supplied by a source DC to a load, and doing so, modify one of the current or voltage characteristics.

SUMMARY

Some embodiments relate to switched-mode power supplies and their operating modes.

An embodiment provides a switched-mode power supply wherein the reference voltage of the feedback loop has an adjustable value.

According to an embodiment, the power supply is a buck converter, the reference voltage being capable of taking a value greater than or equal to the value of the power supply voltage divided by the closed loop gain of the system.

According to an embodiment, the power supply is a boost converter, the reference voltage being capable of taking a value smaller than or equal to the value of the power supply voltage divided by the closed loop gain of the system.

According to an embodiment, the power supply comprises first and second series-connected transistors, the first transistor being connected between the ground and a first node and the second transistor being connected between the first node and a node of application of the power supply voltage, the first and second transistors being capable of being controlled by a circuit for generating the control signals of the first and second transistors.

According to an embodiment, the power supply comprises a first circuit capable of detecting whether the duty cycle of an input signal of the generation circuit is substantially equal to 100%.

According to an embodiment, the power supply comprises a second circuit capable of maintaining the second transistor on if the duty cycle of the input signal of the generation circuit is substantially equal to 100%.

According to an embodiment, the second circuit comprises an AND gate.

According to an embodiment, the first circuit comprises a counter having its reset input connected to the input signal of the generation circuit.

According to an embodiment, the feedback loop is located between the output node of the power supply and a second node.

According to an embodiment, the second node is coupled to ground by a first resistor, the second node being coupled to the output node by a second resistor.

According to an embodiment, the reference voltage is supplied by a third circuit comprising a resistive feedback loop having an adjustable resistance.

According to an embodiment, the reference voltage is supplied by a third circuit comprising a resistive feedback loop having its output coupled to the output of the circuit by a resistive block having an adjustable resistance.

An embodiment provides a method of using a power supply comprising switching from a first state of the reference voltage of the feedback loop to a second state.

According to an embodiment, the power supply is a buck converter, and the reference voltage in the second state is greater than or equal to the power supply voltage divided by the closed loop gain of the system.

According to an embodiment, the power supply is a boost converter, and the reference voltage in the second state is smaller than or equal to a power supply voltage divided by the closed loop gain of the system.

According to an embodiment, the method comprises: determining, by using a first circuit, whether the duty cycle of an input signal of the circuit for generating the control signals of two transistors is substantially equal to 100%; and turning off the components of the power supply other than a second circuit ensuring the connection between the power supply output and a node of application of the power supply voltage.

The foregoing and other features and advantages will be discussed in detail in the following non-limiting description of specific embodiments in connection with the accompanying drawings.

DETAILED DESCRIPTION OF ILLUSTRATIVE EMBODIMENTS

The same elements have been designated with the same reference numerals in the various drawings and, further, the various drawings are not to scale. For clarity, only those steps and elements which are useful to the understanding of the described embodiments have been shown and are detailed.

In the following description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred to the orientation of the concerned elements in the drawings. Unless otherwise specified, the terms "approximately," "substantially," and "in the order of" are used herein to designate a tolerance of plus or minus 10%, preferably of plus or minus 5%, of the value in question.

Figure 1:
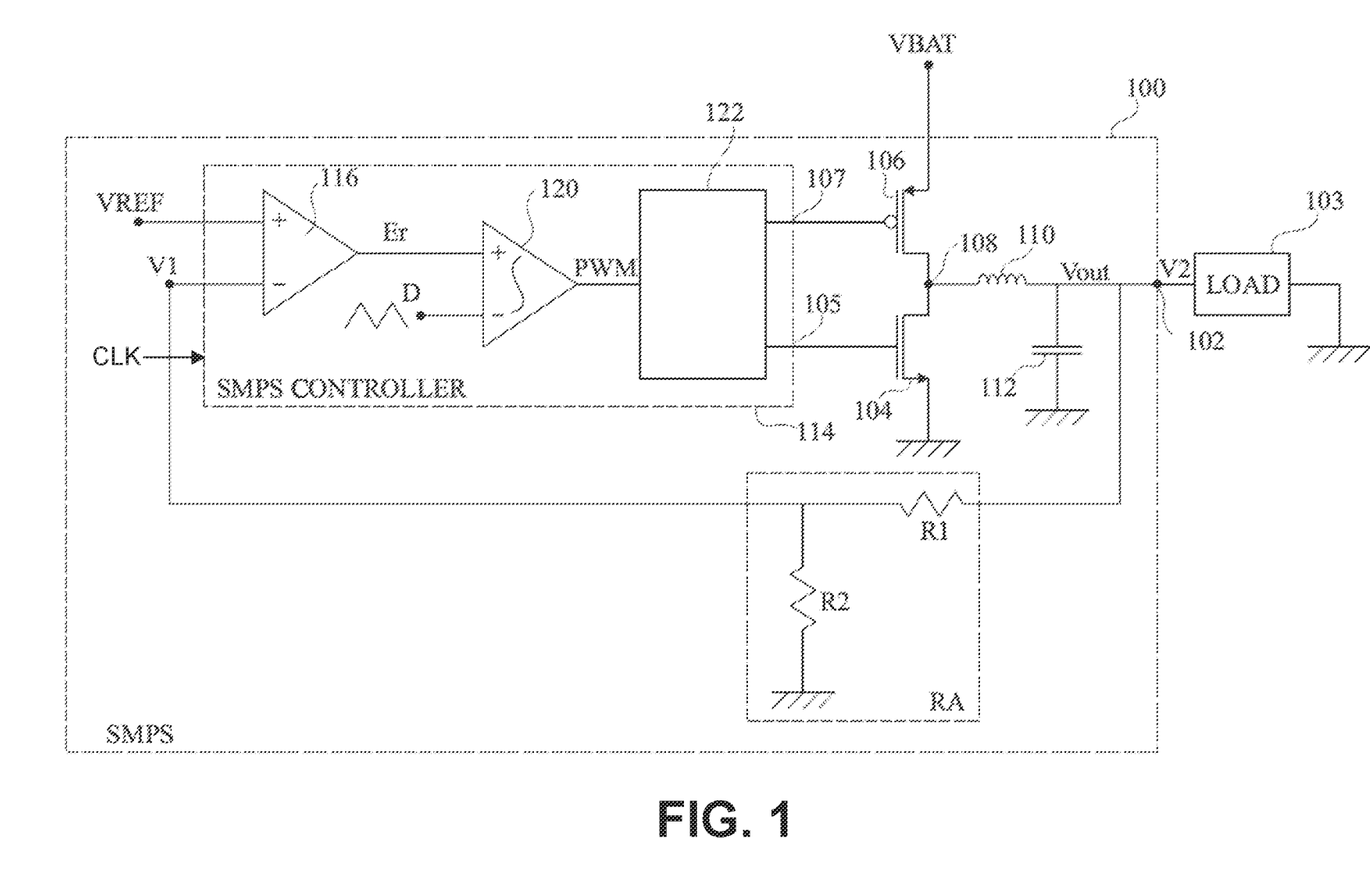
FIG. 1 is a simplified representation of an example of a switched-mode power supply.

FIG. 1 is a simplified representation of an example of switched-mode power supply 100 (SMPS) receiving as an input a power supply voltage VBAT and a reference voltage VREF and supplying a voltage Vout to an output node 102 (V2). The power supply of FIG. 1 is a buck converter, that is, voltage Vout is smaller than power supply voltage VBAT.

Output node 102 is coupled to ground by a load 103 (LOAD). Load 103 is thus powered by converter 100.

Converter 100 comprises two switches 104 and 106 series connected between the node of application of power supply voltage VBAT and the ground. In the example of FIG. 1, switch 104 is an N-channel metal-oxide-semiconductor (MOS) transistor and switch 106 is a P-channel MOS transistor. The source of transistor 106 is connected to a node 108 and its drain is connected to the node of application of voltage VBAT. The source of transistor 104 is connected to ground and its drain is connected to node 108. An inductance no is connected between nodes 108 and 102. Node 102 is further coupled to ground by a capacitor 112.

Transistors 104 and 106 are controlled by a control circuit 114 (SMPS CONTROLLER). More particularly, transistor 106 is controlled by an output 107 of control circuit 114, and transistor 104 is controlled by an output 105 of control circuit 114. Control circuit 114 comprises a comparator 116, for example, an error amplifier. The inputs of comparator 116 are connected to a node of application of reference voltage VREF and to a node V1. The output of comparator 116 supplies a signal Er, representative of the voltage difference between reference voltage VREF and the voltage of node V1.

Node V1 is coupled to output node 102 by a resistive block RA. Power supply 100 thus comprises a resistive feedback loop between output node 102 and node V1. "Feedback voltage" designates the voltage of node V1, that is, the input voltage of the control circuit depending on output voltage Vout.

Block RA comprises for example two resistors, a resistor R1 connected between nodes 102 and V1 and a resistor R2 connected between node V1 and the ground.

Control circuit 114 further comprises a comparator 120 receiving as an input signal Er and a periodic sawtooth signal D. Comparator 120 outputs a pulse-width modulated signal PWM. Signal PWM is a periodic binary signal comprising a high state and a low state. The duty cycle of signal PWM is controlled by signal Er. Thus, the larger the difference between reference voltage VREF and the feedback voltage, that is, signal Er, the larger the duty cycle of signal PWM.

Control circuit 114 further comprises driver 122 for generating the control signals of transistors 104 and 106. More particularly, when signal PWM is in the high state, driver 122 turns on switch 106 and turns off switch 104 and when signal PWM is in the low state, driver 122 turns off switch 106 and turns on switch 104.

Under certain conditions, for example when the power supplied by the power source is not sufficiently high (is for example smaller than 5 W), the use of a switched-mode power supply such as power supply 100 may be neither cost-effective nor efficient.

It may then be desired for output node 102 of the switched-mode power supply to directly and continuously receive the power supplied by the power source. Such an operating mode is called bypass mode. It could be envisaged to simply connect, for example, by using a switch, the source of application of voltage VBAT to node 102. However, the turning on of this switch may cause a current peak on node 102. Such a current peak may risk damaging certain elements of power supply 100, for example, switches connecting two nodes or a power source and a node.

Figure 2:
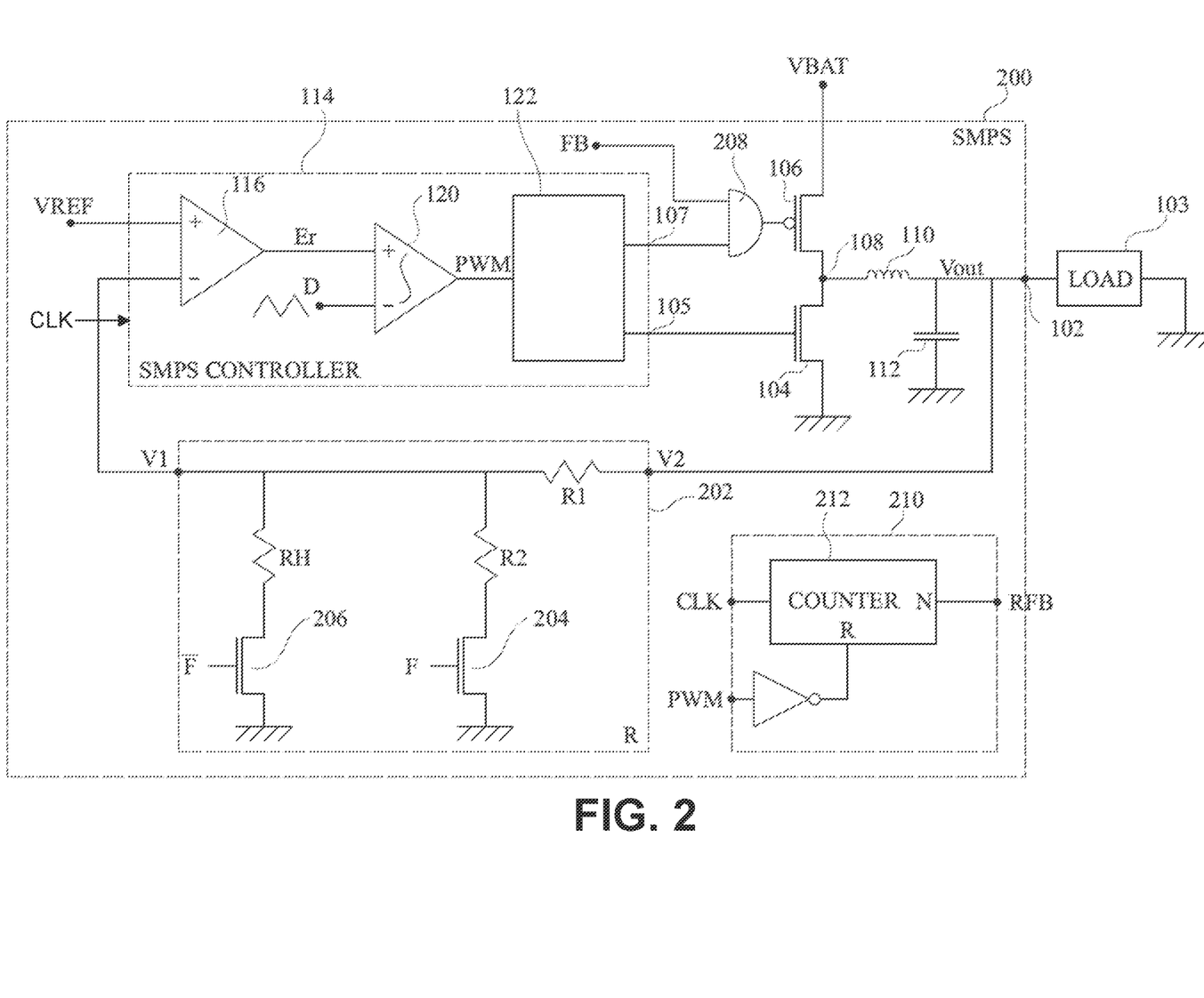
FIG. 2 is a simplified representation of an embodiment of a switched-mode power supply.

FIG. 2 is a simplified representation of an embodiment of a switched-mode power supply 200 powering load 103 and receiving power supply voltage VBAT. Power supply 200 is, like power supply 100 of FIG. 1, a buck converter. Power supply 200 comprises the elements of power supply 100. In particular, power supply 200 comprises control circuit 114, switches 104 and 106, inductance no, and capacitor 112.

The feedback loop is a resistive feedback loop having an adjustable value. More particularly, the feedback loop comprises a resistive block 202 (R), different from resistive block RA of power supply 100, having at least two resistive states. Like block RA, block R is connected between nodes V1 and V2 and comprises resistor R1 connected between nodes V1 and V2. Node V1 is further coupled to ground by resistor R2 in series with a switch 204. Switch 204 is controlled by a binary signal F. Node V1 is also coupled to ground by a resistor RH in series with another switch 206. Switch 206 is controlled by a binary signal $\overline{F}$ corresponding to the signal inverse to signal F. Switches 204 and 206 are for example MOS transistors.

Other examples of resistive blocks will be described hereafter.

Power supply 200 further comprises an AND gate 208 having its inputs connected to output 107 of control circuit 114 and to a node of application of a voltage FB. The output signal of gate 208 controls transistor 106.

The AND gate may optionally be replaced with a circuit capable of maintaining, on order, transistor 106 on.

Power supply 200 further comprises a circuit 210 comprising a counter 212 (COUNTER N). Counter 212 outputs a signal RFB and is incremented, for example, at each rising edge of a clock signal CLK. Clock signal CLK corresponds to the clock signal of control circuit 114 and, in particular, clock signal CLK has the same frequency as input signal D of comparator 120.

Reset input R of counter 212 is coupled to the output of comparator 120 and thus receives signal PWM or a signal representative of signal PWM. In the example of FIG. 2, input R is coupled to the output of comparator 120 by an inverter. However, there may be no such inverter. The counter is thus reset each time signal PWM takes the low value.

Figure 3:
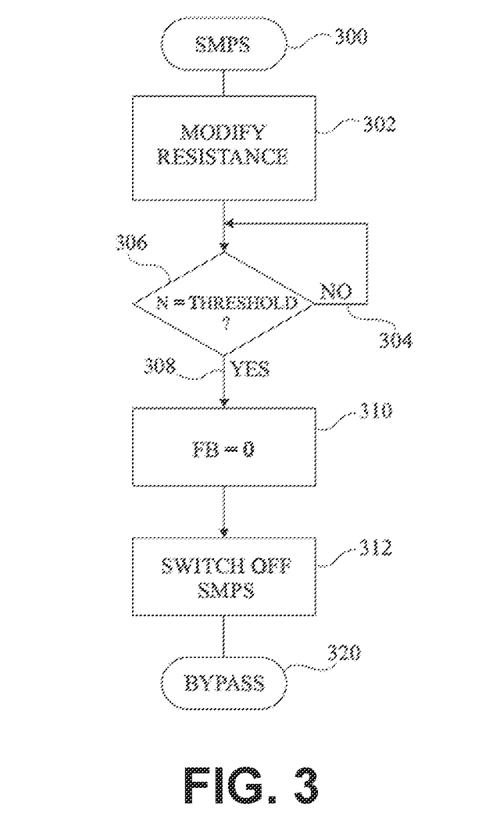
FIG. 3 illustrates an operating mode of the switched-mode power supply of FIG. 2.

FIG. 3 illustrates, in the form of blocks, an operating mode of switched-mode power supply 200 of FIG. 2.

The described operating mode corresponds to the passing from a state 300 (SMPS) where load 103 is powered by switched-mode power supply 200, to a state 320 (BYPASS) in bypass mode, where load 103 is directly powered by the source of application of voltage VBAT, through switch 106 of the converter.

The operating mode comprises a step 302 (MODIFY RESISTANCE) during which the resistance of resistive block R is modified, for example, to switch from a first state to a second state. The characteristics of the first state are selected so that voltage Vout is smaller than voltage VBAT and the characteristics of the second state are selected so that voltage Vout is equal to voltage VBAT (saturation).

For example, in a first state of resistive block R of the example of FIG. 2, transistor 204 is on and transistor 206 is off. Voltage Vout then may be equal to:

$$V\text{out}=V\text{REF}*(1+R1/R2).$$

Reference voltage VREF, as well as resistors R1 and R2, are selected so that voltage Vout is smaller than voltage VBAT.

In a second state of resistive block R of the example of FIG. 2, transistor 204 is off and transistor 206 is on. Voltage Vout then may be equal to:

$$V\text{out}=V\text{REF}*(1+R1/RH).$$

The values of voltage VREF and of resistor R1 may not change from the first state. Resistor RH may be selected to have:

$$V\text{REF}*(1+R1/RH) \geq V\text{BAT}.$$

The value of resistor RH is, in this example, smaller than the value of resistor R2.

More generally, the resistor is modified so that the quotient of the resistance between nodes V1 and V2 to the resistance between node V1 and the ground increases.

Such a state switching of resistive block R causes a progressive increase of voltage V1. Voltage V1 then increases to be greater than or equal to power supply voltage VBAT. Such an increase comprises no current peak risking damaging components.

The state switching of resistor block R causes a variation of the duty cycle of signal PWM. More particularly, the more voltage V1 increases, the more the duty cycle of signal PWM increases, to reach 100% when voltage Vout becomes equal to voltage VBAT.

As long as the duty cycle of signal PWM is not equal to 100%, counter 212 is reset by signal PWM once per period of clock signal CLK. Value N corresponding to the value counted by counter 212 thus cannot reach a threshold (THRESHOLD), the threshold having been selected to be greater than 3, for example, 32. This corresponds to branch 304 (NO) of condition 306 (N=THRESHOLD?).

When the value of voltage Vout takes a value equal to the value of voltage VBAT and the duty cycle of signal PWM becomes equal to 100%, signal PWM becomes constant and the counter is no longer reset. Value N of the counter thus increases to reach the threshold value. This corresponds to branch 308 (YES) of condition 306.

Once the threshold is reached, output signal RFB of counter 212 causes the application of voltage FB to an input of gate 208. Voltage FB is forced to a binary value to keep transistor 106 on. This corresponds to step 310 (FB=0). Thus, whatever the value of the outputs of circuit 122, voltage FB keeps transistor 106 on.

The different elements of power supply 200, except for voltage FB, are then turned off. In particular, control circuit 114 and circuit 210 are turned off, and, e.g., the outputs of driver 122 stop switching. This corresponds to step 312 (SWITCH OFF SMPS).

The system then enters bypass mode 320, that is, load 103 is directly powered by the node of application of voltage VBAT, that is, constantly via switch 106, transistor 106 being kept on by voltage FB.

An advantage of this embodiment is that the increase of voltage Vout has been progressive, in the same way as the increase of voltage V1 caused by the modification of the resistance of the feedback loop.

Figure 4:
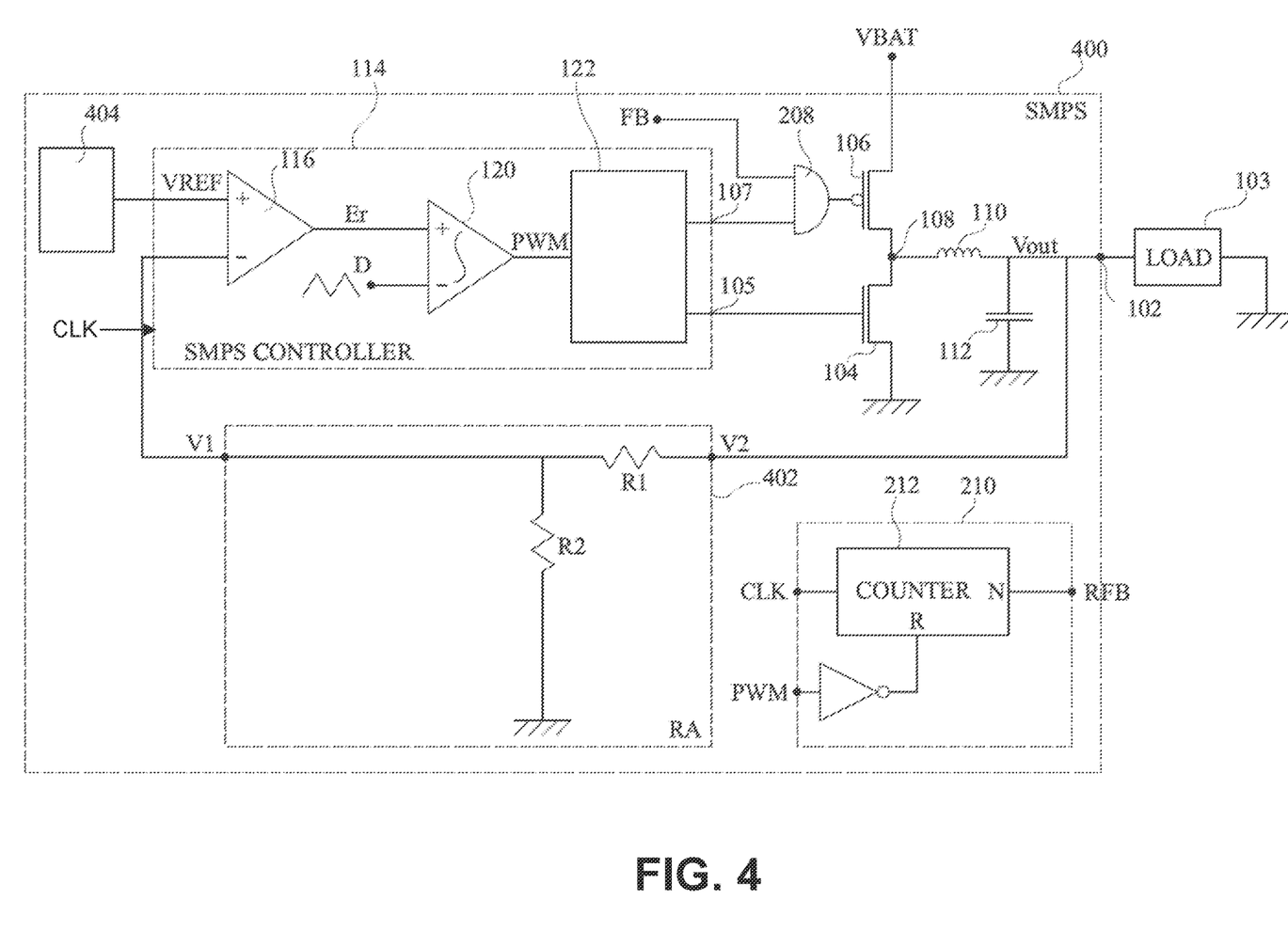
FIG. 4 is a simplified representation of an embodiment of a switched-mode power supply.

FIG. 4 is a simplified representation of an embodiment of a switched-mode power supply 400 powering load 103. Power supply 400 is a buck converter and comprises elements similar to power supply 200. In particular, power supply 400 comprises control circuit 114, gate 208, transistors 106 and 104, inductance 110, capacitor 112, and circuit 210.

Nodes V1 and V2 are coupled by a resistive block 402. Resistive block 402 for example has a fixed resistance value. Block 402 is for example similar to resistive block RA of FIG. 1.

Figure 8:
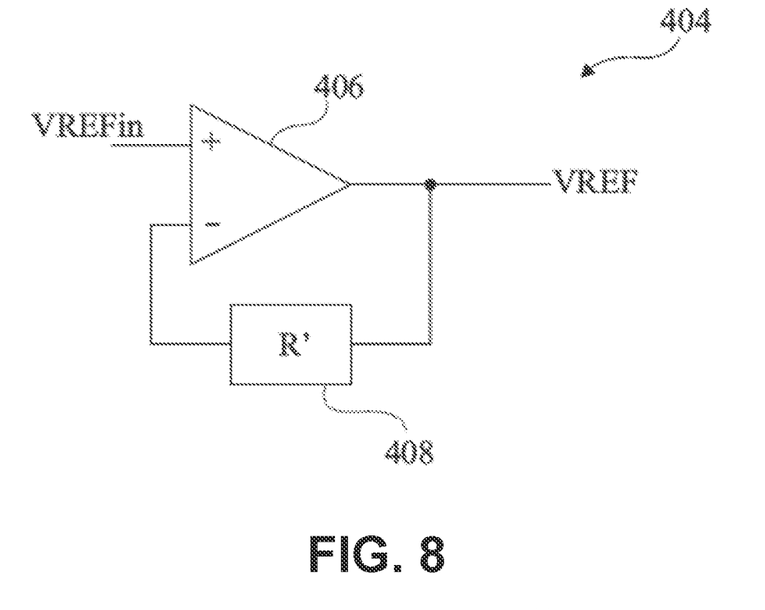
FIGS. 8 and 9 partially show variations of the embodiment of FIG. 4.
Figure 9:
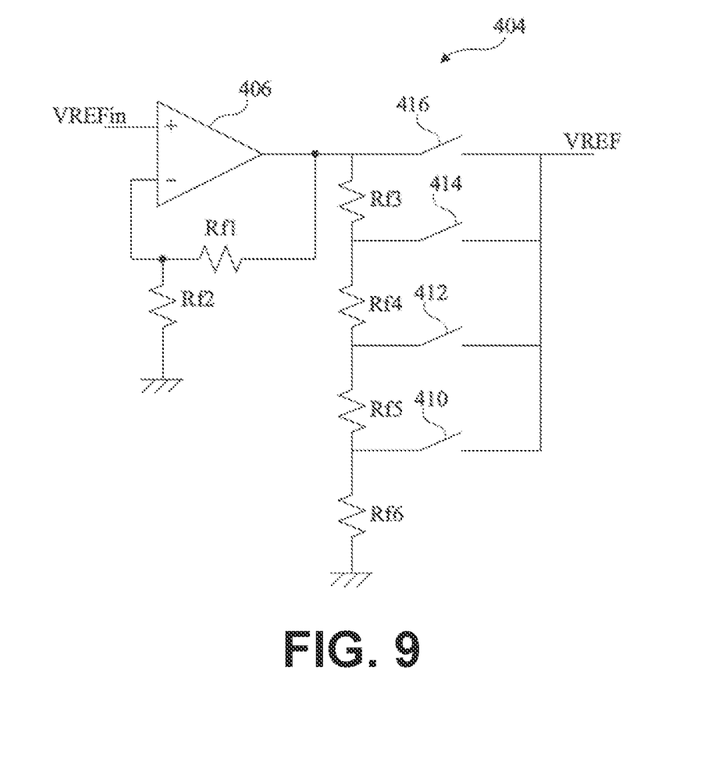

Power supply 400 further comprises a circuit 404 enabling to modify reference voltage VREF. Circuit 404 for example comprises an amplifier circuit having an adjustable gain. Another example of circuit 404 comprises a voltage dividing bridge. Two examples of circuit 404 are illustrated in FIGS. 8 and 9.

The operating mode of power supply 400 is similar to that described in relation with FIG. 3, except for step 302 which is replaced with a step during which reference voltage VREF becomes greater than or equal to the power supply voltage divided by the closed loop gain of the system. The other steps remain identical.

Figure 5:
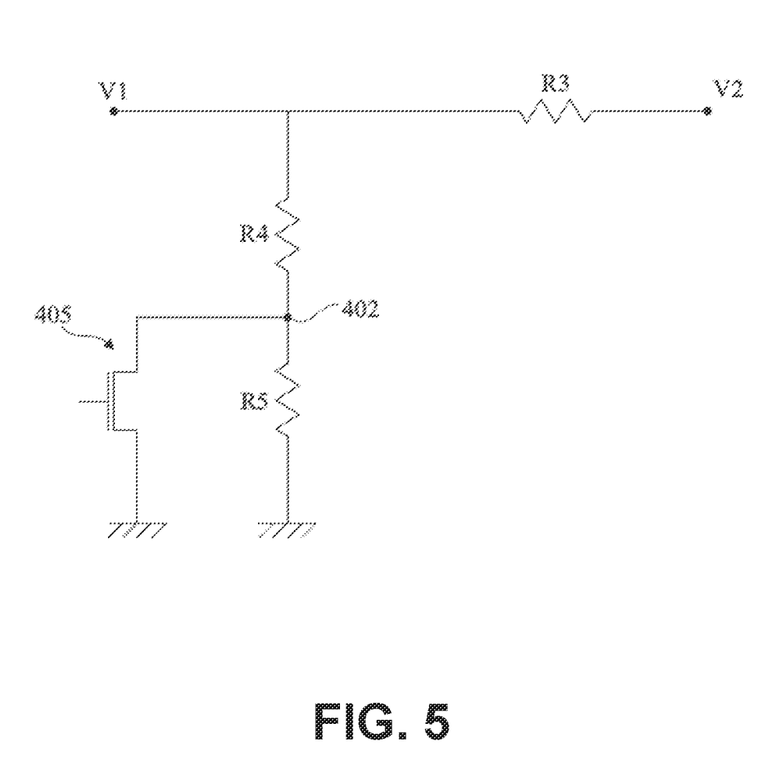
FIGS. 5, 6, and 7 partially show variations of the embodiment of FIG. 2.

FIG. 5 shows a variation of a portion of the embodiment of FIG. 2. More particularly, FIG. 5 shows another example of a resistive block R, located between nodes V1 and V2.

Nodes V1 and V2 are, as in the example of FIG. 2, coupled by a resistor R3, for example, having a resistance equal to that of resistor R1. Node V1 is, further, coupled to ground by two series-connected resistors R4 and R5. Resistor R5 is connected to ground and resistor R4 is connected to node V1. The value of resistance R4 is for example equal to the value of resistance RH of FIG. 2, and resistor R5 is for example selected so that the sum of the values of resistances R4 and R5 are equal to the value of resistance R2.

Connection node 402 of resistors R4 and R5 is further coupled to ground by a switch 405, for example, a MOS transistor.

Thus, the first state of resistive block R corresponds to a state where switch 405 is off. Node V1 is thus coupled to ground by a resistor equivalent to R2. The second state of resistive block R corresponds to a state where switch 405 is on. Node V1 is thus coupled to ground by resistor R4.

Figure 6:
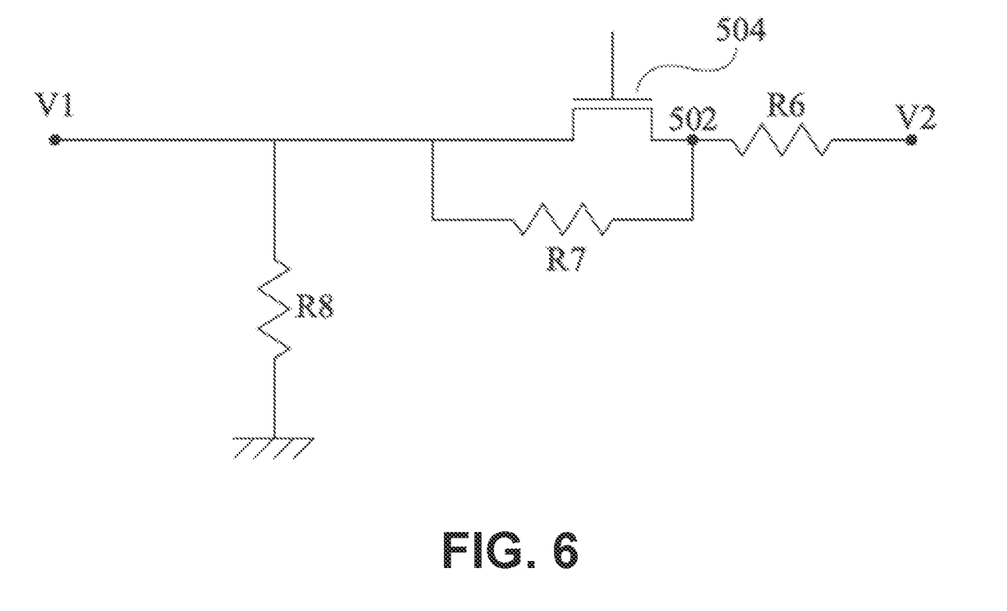

FIG. 6 shows another variation of a portion of the embodiment of FIG. 2. More particularly, FIG. 6 shows another example of a resistive block R, located between nodes V1 and V2.

A resistor R6, for example, having a resistance equal to that of resistor R1, is connected between node V2 and a node 502. A switch 504 and a resistor R7 are connected in parallel between node 502 and node V1. Further, node V1 is coupled to ground by resistor R8, for example, having a resistance equal to that of resistor R2.

The first state of resistive block R corresponds to the state where switch 504 is on. Thus, the resistance between node V1 and node V2 is R6, as in the first state of block R of FIG. 2.

The second state of resistive block R corresponds to the state where switch 504 is off. Thus, the resistance between nodes V1 and V2 is R6+R7 and is thus greater than the resistance between node V1 and node V2 of the first state.

The value of resistance R7 is selected so that voltage Vout=VREF*(1+((R6+R7)/R8) is greater than or equal to, preferably greater than, voltage VBAT.

Figure 7:
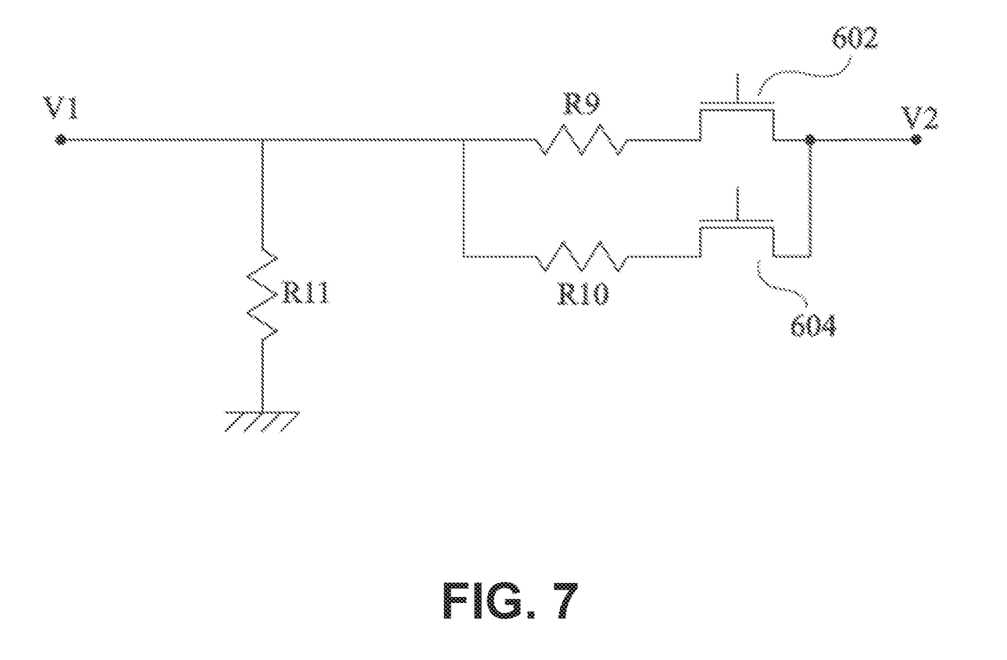

FIG. 7 shows another variation of a portion of the embodiment of FIG. 2. More particularly, FIG. 7 shows another example of a resistive block R, located between nodes V1 and V2.

Nodes V1 and V2 are connected by a switch 602, for example, a transistor, in series with a resistor R9, for example, having a resistance equal to that of resistor R1.

Nodes V1 and V2 are also connected by a switch 604, for example, a transistor, in series with a resistor R10. Switch 602 and resistor R9 are thus in parallel with switch 604 and resistor R10. Node V1 is also coupled to ground by resistor R11, for example, having a resistance equal to that of resistor R2.

The first state of resistive block R corresponds to the state where switch 602 is on and switch 604 is off. Thus, the resistance between node V1 and node V2 is R9.

The second state of resistive block R corresponds to the state when switch 602 is off and switch 604 is on. Thus, the resistance between node V1 and node V2 is R10.

The value of resistance R10 is selected to be greater than R9 and so that voltage Vout=VREF*(1+R10/R11) is greater than or equal to, preferably greater than, VBAT.

FIGS. 8 and 9 partially show variations of the embodiment of FIG. 4. More particularly, FIGS. 8 and 9 show examples of circuits 404. The circuits 404 of FIGS. 8 and 9 receive as an input a voltage VREFin, for example substantially constant, and output reference voltage VREF.

In the example of FIG. 8, circuit 404 comprises an operational amplifier 406 receiving at its positive input (+) voltage VREFin and outputting voltage VREF. The negative input (−) of operational amplifier 406 is coupled to its output by a resistive block 408 (R') having an adjustable resistance. Block 408 for example has a structure similar to a resistive block R such as described in relation with FIG. 2, 5, 6, or 7.

In the example of FIG. 9, circuit 404 similarly comprises operational amplifier 406 receiving at its positive input (+) voltage VREFin. The negative input (−) of operational amplifier 406 is coupled to its output by a resistor Rf1, the negative input of operational amplifier 406 being coupled to ground by a resistor Rf2. The output of the operational amplifier is also coupled to ground by a resistive block having an adjustable resistance. More particularly, the output of the operational amplifier is coupled to ground by four series-connected resistors Rf3, Rf4, Rf5, and Rf6. In practice, the series-connected resistors may come by any number. Each node connecting two of the four series-connected resistors is coupled to the output of circuit 404 by a switch 410, 412, or 414. Further, the output of the operational amplifier is coupled to the output of circuit 404 by a switch 416. The states of switches 410, 412, 414, and 416 are modified to adjust the value of voltage VREF.

Figure 10:
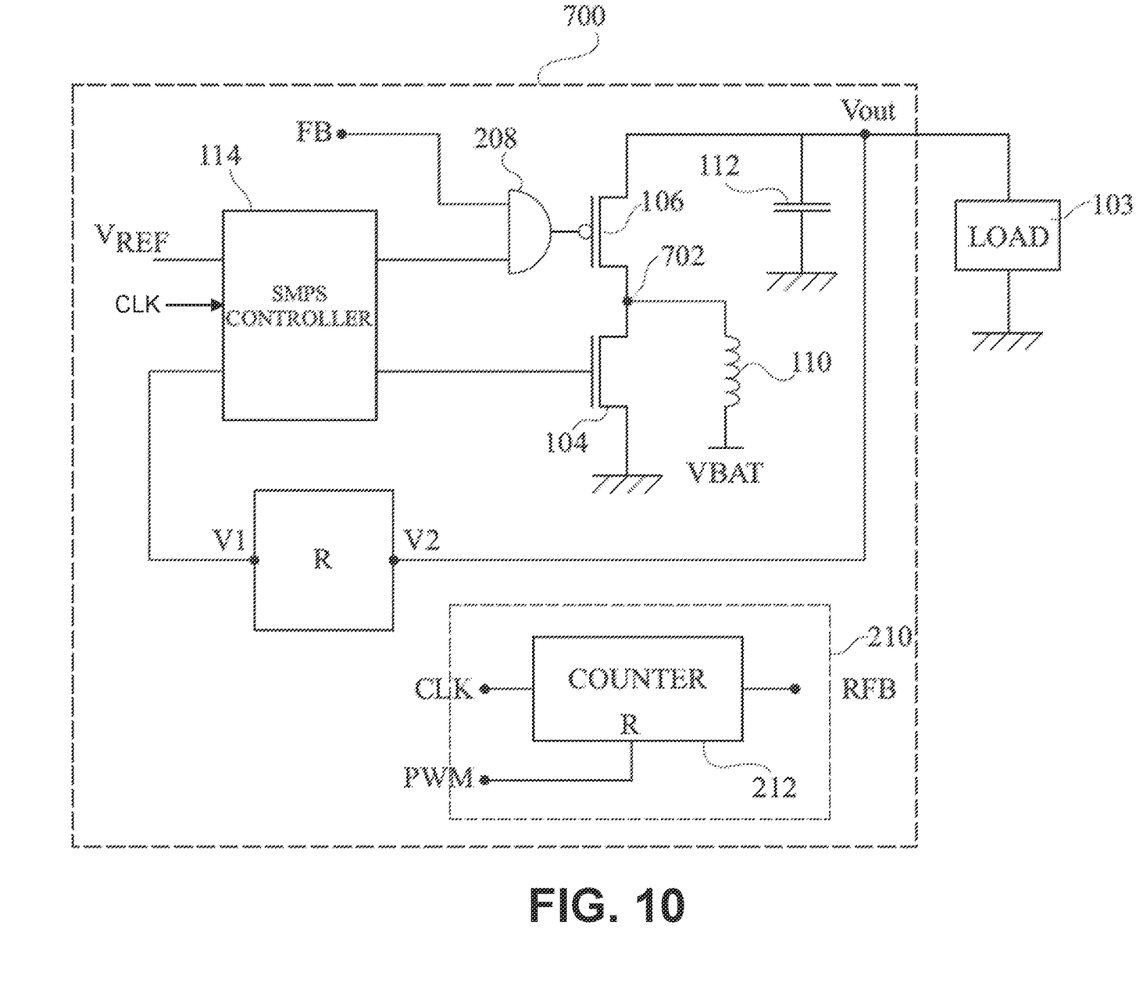
FIG. 10 is a simplified representation of another embodiment of a switched-mode power supply.

FIG. 10 is a simplified representation of another embodiment of a switched-mode power supply 700. Power supply 700 is here a boost power supply, that is, output voltage Vout is greater than power supply voltage VBAT.

Power supply 700 comprises, like power supply 200 of FIG. 2, the control circuit 114 receiving reference voltage VREF and the voltage of node V1. Power supply 700 further comprises a resistive block R, such as those described in FIGS. 2, 5, 6, and 7, between nodes V1 and V2, node V2 corresponding to the node at which output voltage Vout is available. The power supply further comprises transistors 104 and 106, series-connected between node V2 and the ground. More particularly, transistor 106 is connected between node V2 and a node 702 and transistor 104 is connected between node 702 and the ground. Transistor 104 is controlled by control circuit 114. Transistor 106 is controlled, as in FIG. 2, by the output signal of gate 208, receiving as an input a signal FB and an output signal of control circuit 114.

Node 702 is coupled to the node of application of voltage VBAT by inductance 110. Node V2 is, as in FIGS. 1 and 2, coupled to ground by capacitor 112 and by load 103.

Power supply 700 further comprises circuit 210 comprising counter 212.

Power supply 700 may operate in bypass mode, like the previously-described power supplies, which allows an operation at lower noise. In bypass mode, transistor 106 is kept on, transistor 104 is kept off and control circuit 114 may be turned off.

The transition between the mode where the load is powered by the switched-mode power supply and the bypass mode is similar to the succession of steps described in relation with FIG. 3.

During step 302 of modification of resistance R, the quotient of the resistance between nodes V1 and V2 to the resistance between node V1 and the ground decreases. The characteristics of such a decrease, that is, for example, the resistance values, are selected so that the feedback voltage becomes progressively substantially smaller than or equal to the power supply voltage and that output voltage Vout becomes progressively substantially equal to VBAT.

The other steps of the operating mode described in relation with FIG. 3 are not significantly modified.

According to another embodiment of a boost converter, resistive block R is for example identical to resistive block RA of FIG. 1, and power supply 700 comprises a circuit identical or similar to circuit 404 enabling to modify reference voltage VREF. Step 302 is replaced with a step during which reference voltage VREF becomes smaller than or equal to the power supply voltage divided by the closed loop gain of the system. The other steps remain identical.

Specific embodiments have been described. Various alterations, modifications, and improvements will readily occur to those skilled in the art.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of operating a switched-mode power supply, the method comprising:
   receiving a power supply voltage at a supply terminal;
   receiving a clock signal having a first frequency;
   receiving a pulse-width modulation (PWM) signal having the first frequency;
   operating the switched-mode power supply in a first mode, wherein operating the switched-mode power supply in the first mode comprises generating an output voltage at an output of the switched-mode power supply based on the PWM signal, wherein the output voltage is different than the power supply voltage;
   adjusting a resistance value of a feedback network of the switched-mode power supply;
   after adjusting the resistance value, counting a number of consecutive cycles of the clock signal in which the PWM signal does not switch;
   when the number of consecutive cycles of the clock signal in which the PWM signal does not switch reaches a first threshold, turning on a first transistor to cause the power supply voltage to be delivered to the output of the switched-mode power supply to operate the switched-mode power supply in a second mode; and stop switching the switched-mode power supply when operating the switched-mode power supply in the second mode.

2. The method of claim 1, wherein the feedback network comprises:
   a first terminal;
   a second terminal;
   a ground terminal;
   a first resistor coupled between the first and second terminals; and
   a second transistor coupled between the first terminal and the ground terminal, wherein adjusting the resistance value of the feedback network comprises controlling the first transistor.

3. The method of claim 2, wherein the feedback network further comprises:
   a second resistor coupled between the first resistor and the ground terminal, the second resistor coupled in series with the first transistor;
   a third resistor coupled between the first resistor and the ground terminal; and
   the second transistor coupled in series with the third resistor, the method further comprising:
   controlling the first transistor with a first controlling signal, and controlling the second transistor with a second controlling signal that has phase opposite to a phase of the first controlling signal.

4. The method of claim 2, wherein the feedback network further comprises:
   a second resistor coupled between the first resistor and an intermediate node; and
   a third resistor coupled between the intermediate node and the ground terminal, wherein the first transistor is coupled between the intermediate node and the ground terminal.

5. The method of claim 2, wherein the feedback network further comprises:
   a second resistor coupled between the first resistor and an intermediate node; and
   a third resistor coupled between the intermediate node and the ground terminal, wherein the first transistor is coupled between the first resistor and the intermediate node.

6. The method of claim 2, wherein the feedback network further comprises:
   a second resistor coupled between the first resistor and the ground terminal, the first transistor coupled between the first terminal and the first resistor;
   a third resistor coupled between the first terminal and the second resistor; and
   the second transistor coupled between the third resistor and the first terminal.

7. The method of claim 1, further comprising generating the PWM signal using a comparator, wherein the feedback network is coupled between the output of the switched-mode power supply and an input of the comparator.

8. The method of claim 1, further comprising:
   generating a reference signal using a variable reference signal generator that comprises an operational amplifier;
   providing the reference signal to a comparator; and
   generating the PWM signal based on the reference signal, wherein the feedback network is coupled between an output of the operational amplifier and an input of the operation amplifier.

9. The method of claim 1, wherein counting the number of consecutive cycles of the clock signal in which the PWM signal does not switch comprises using a counter having a first input configured to receive the clock signal, and a second input coupled to an inverter that is configured to receive the PWM signal.

10. A method of operating a switched-mode power supply having a switching mode and a bypass mode, the method comprising:
    receiving a power supply voltage at a supply terminal;
    receiving a clock signal having a first frequency;
    receiving a pulse-width modulation (PWM) signal having the first frequency;
    when the switched-mode power supply is in the switching mode, generating an output voltage at an output terminal of the switched-mode power supply based on the PWM signal;
    when the switched-mode power supply is in the bypass mode, connecting the supply terminal to the output terminal; and
    when transitioning from the switching mode to the bypass mode:
      changing the switched-mode power supply from a first state to a second state to cause a progressive change in the output voltage towards the power supply voltage,
      after changing the switched-mode power supply from the first state to the second state, counting a number of consecutive cycles of the clock signal in which the PWM signal does not switch, and
      when the number of consecutive cycles of the clock signal in which the PWM signal does not switch reaches a first threshold, connecting the supply terminal to the output terminal.

11. The method of claim 10, wherein connecting the supply terminal to the output terminal comprises turning fully on a transistor that is coupled between the supply terminal and the output terminal.

12. The method of claim 10, wherein changing the switched-mode power supply from the first state to the second state comprises changing a state of a feedback network of the switched-mode power supply from a first resistance state having a first resistance to a second resistance state having a second resistance that is difference than the first resistance.

13. The method of claim 10, further comprising:
    generating a reference signal using a variable reference signal generator; and
    generating the PWM signal based on the reference signal, wherein changing the switched-mode power supply from the first state to the second state comprises changing the variable reference signal generator from a first generator state in which the reference signal has a first voltage to a second generator state in which the reference signal has a second voltage different than the first voltage.

14. The method of claim 13, wherein the variable reference signal generator comprises:
    an operational amplifier;
    a first resistor coupled between an output of the operational amplifier and a first intermediate node;
    a second resistor coupled between the first intermediate node and a second intermediate node;
    a first switch coupled between the first intermediate node and an output of the variable reference signal generator; and a second switch coupled between the second intermediate node and the output of the variable reference signal generator, wherein changing the variable reference signal generator from the first generator state to the second generator state comprises changing a state of the first or second switches.

15. The method of claim 13, wherein the variable reference signal generator comprises an operational amplifier having a feedback network, wherein changing the variable reference signal generator from the first generator state to the second generator state comprises changing a state of the feedback network from a first resistance state having a first resistance to a second resistance state having a second resistance that is difference than the first resistance.

16. The method of claim 10, wherein causing the progressive change in the output voltage towards the power supply voltage comprises causing an increase in the output voltage.

17. The method of claim 10, wherein causing the progressive change in the output voltage towards the power supply voltage comprises causing a decrease in the output voltage.

18. The method of claim 10, wherein the first threshold is greater than 3.

19. A method of operating a switched-mode power supply comprising a resistive feedback loop having an adjustable value, the method comprising:
    receiving a power supply voltage at a supply terminal;
    receiving a clock signal having a first frequency;
    receiving a pulse-width modulation (PWM) signal having the first frequency;
    when the switched-mode power supply is in a switching mode, generating an output voltage at an output terminal of the switched-mode power supply based on the PWM signal;
    when the switched-mode power supply is in a bypass mode, connecting the supply terminal to the output terminal; and
    when transitioning from the switching mode to the bypass mode:
        switching from a first state of the resistive feedback loop to a second state of the resistive feedback loop while continuing to generate the output voltage based on the PWM signal switching at the first frequency to cause a progressive change in the output voltage towards the power supply voltage, and
        when a duty cycle of the PWM signal reaches a predetermined threshold, connecting the supply terminal to the output terminal.

20. The method of claim 19, wherein the switched-mode power supply is a buck converter, and wherein the second state of the resistive feedback loop is capable of making a feedback voltage greater than or equal to the power supply voltage.

21. The method of claim 19, wherein the switched-mode power supply is a boost converter, and wherein the second state of the resistive feedback loop is capable of making a feedback voltage smaller than or equal to the power supply voltage.

22. The method of claim 19, wherein the predetermined threshold is 100%, and wherein, when transitioning from the switching mode to the bypass mode:
    after switching from the first state of the resistive feedback loop to the second state of the resistive feedback loop, counting a number of consecutive cycles of the clock signal in which the PWM signal does not switch, and
    when the number of consecutive cycles of the clock signal in which the PWM signal does not switch reaches a first threshold, connecting the supply terminal to the output terminal.

\* \* \* \* \*